United States Patent
Park et al.

(10) Patent No.: US 9,535,250 B2
(45) Date of Patent: Jan. 3, 2017

(54) HEAD MOUNTED DISPLAY DEVICE AND METHOD FOR CONTROLLING THE SAME

(71) Applicant: LG ELECTRONICS INC., Seoul (KR)

(72) Inventors: Hyorim Park, Seoul (KR); Doyoung Lee, Seoul (KR); Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 180 days.

(21) Appl. No.: 14/080,346

(22) Filed: Nov. 14, 2013

(65) Prior Publication Data

US 2015/0061973 A1    Mar. 5, 2015

(30) Foreign Application Priority Data

Aug. 28, 2013 (KR) .................. 10-2013-0102343

(51) Int. Cl.
  *G09G 5/00*     (2006.01)
  *G02B 27/01*    (2006.01)
  *G06F 3/00*     (2006.01)

(52) U.S. Cl.
  CPC .............. *G02B 27/017* (2013.01); *G06F 3/00* (2013.01); *G02B 2027/0138* (2013.01); *G02B 2027/0141* (2013.01)

(58) Field of Classification Search
  CPC .................. G02B 27/017; G02B 2027/0178; G02B 2027/0138; G02B 2027/0141; G06K 9/00671; G06T 19/006; H04N 5/45; H04N 13/044; G06F 3/00
  USPC .................................................. 345/8, 633
  See application file for complete search history.

(56) References Cited

U.S. PATENT DOCUMENTS

| | | | |
|---|---|---|---|
| 2010/0085462 A1* | 4/2010 | Sako | G02B 27/017 348/333.01 |
| 2012/0050140 A1 | 3/2012 | Border et al. | |
| 2012/0135784 A1 | 5/2012 | Lee et al. | |
| 2012/0254930 A1 | 10/2012 | Pack et al. | |
| 2013/0281208 A1* | 10/2013 | Lyons | G07F 17/3211 463/33 |
| 2014/0035877 A1* | 2/2014 | Cai | H04H 60/33 345/175 |

(Continued)

FOREIGN PATENT DOCUMENTS

| | | |
|---|---|---|
| JP | 2012-205191 A | 10/2012 |
| KR | 10-2010-0125698 A | 12/2010 |
| KR | 10-2013-0049673 A | 5/2013 |

*Primary Examiner* — Awr Awad
*Assistant Examiner* — Aaron Midkiff
(74) *Attorney, Agent, or Firm* — Birch, Stewart, Kolasch & Birch, LLP (57) ABSTRACT

A head mounted display (HMD) device according to one embodiment comprises a communication unit configured to transmit and receive data; a display unit configured to display visual information; a camera unit configured to capture an image; and a processor configured to control the communication unit, the display unit and the camera unit, wherein the processor is further configured to: detect an object image from a first image, which includes the object image, the first image being displayed in an external device located in an angle of view area of the camera unit, display information related to the object image, and display the first image in addition to the information when detecting that the first image is switched to a second image, which does not include the object image.

19 Claims, 7 Drawing Sheets

(56) References Cited

U.S. PATENT DOCUMENTS

2014/0071116 A1* 3/2014 Johansson ............. G06T 19/006
                                                    345/419
2014/0282220 A1* 9/2014 Wantland ............ G06F 3/04845
                                                    715/782

* cited by examiner

HEAD MOUNTED DISPLAY DEVICE AND METHOD FOR CONTROLLING THE SAME

Pursuant to 35 U.S.C. §119(a), this application claims the benefit of the Korean Patent Application No. 10-2013-0102343, filed on Aug. 28, 2013, which is hereby incorporated by reference as if fully set forth herein.

BACKGROUND OF THE DISCLOSURE

Field of the Disclosure

The present specification relates to a head mounted display device, and more particularly, to a head mounted display device and a method for controlling the same, in which a first image and information on the first image are displayed if the first image is changed to a second image while the information on the first image is being displayed in an external device.

Discussion of the Related Art

A head mounted display (hereinafter, referred to as HMD) device allows a user to wear on his/her head like glasses. Information displayed in the HMD device may be provided to the user. In particular, the HMD device may detect an object image at the front and provide the user with information on the detected object image.

However, the HMD device according to the related art may not display information on an object image located in an angle of view area or may maintain display of the information if the object image is not detected while the HMD device is displaying the information on the object image.

If the HMD device does not display the information on the object image, continuity in providing information is not assured, whereby a problem occurs in that confusion may be caused to a user. On the other hand, if the HMD device maintains display of the information even though the object image is not detected, a problem occurs in that the user may misunderstand the corresponding information as information on other object image.

SUMMARY OF THE DISCLOSURE

Accordingly, the present specification is directed to an HMD device and a method for controlling the same, which substantially obviate one or more problems due to limitations and disadvantages of the related art.

An object of the present specification is to provide an HMD device and a method for controlling the same, in which a contents image, which includes a corresponding object image, and information on the object image are displayed if the object image is not detected while the information on the object image is being displayed in an external device.

Another object of the present specification is to provide an HMD device and a method for controlling the same, in which corresponding information is displayed to correspond to an object image if information on the object image is displayed.

Other object of the present specification is to provide an HMD device and a method for controlling the same, in which a contents image, which includes an object image, and information on the corresponding image are displayed so as not to overlap with a contents image, which does not include an object image. In this case, the contents image, which does not include an object image, may represent a contents image which is being displayed in an external device.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a head mounted display (HMD) device according to one embodiment comprises a communication unit configured to transmit and receive data; a display unit configured to display visual information; a camera unit configured to capture an image; and a processor configured to control the communication unit, the display unit and the camera unit, wherein the processor is further configured to: detect an object image from a first image, which includes the object image, the first image being displayed in an external device located in an angle of view area of the camera unit, display information related to the object image, and display the first image in addition to the information when detecting that the first image is switched to a second image, which does not include the object image.

According to one embodiment, as the object image is not detected, the device may separately display the contents image, which includes the object image, and the information on the object image, whereby continuity in providing information to a user may be assured.

Also, according to another embodiment, since the device displays information to correspond to the object image, the user may intuitively know an object to which the corresponding information belongs.

Also, according to other embodiment, the device may display the contents image, which includes the object image, and the information on the corresponding image so as not to overlap with a contents image which is being displayed in an external device, whereby the user's vision may be obtained.

More detailed advantages of the present specification will hereinafter be described in more detail.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE DISCLOSURE

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Moreover, although the embodiments will be described in detail with reference to the accompanying drawings and the disclosure described by the drawings, it is to be understood that the present specification is not limited by such embodiments. Hereinafter, for convenience of description, an HMD device may be referred to as "device".

Figure 1:
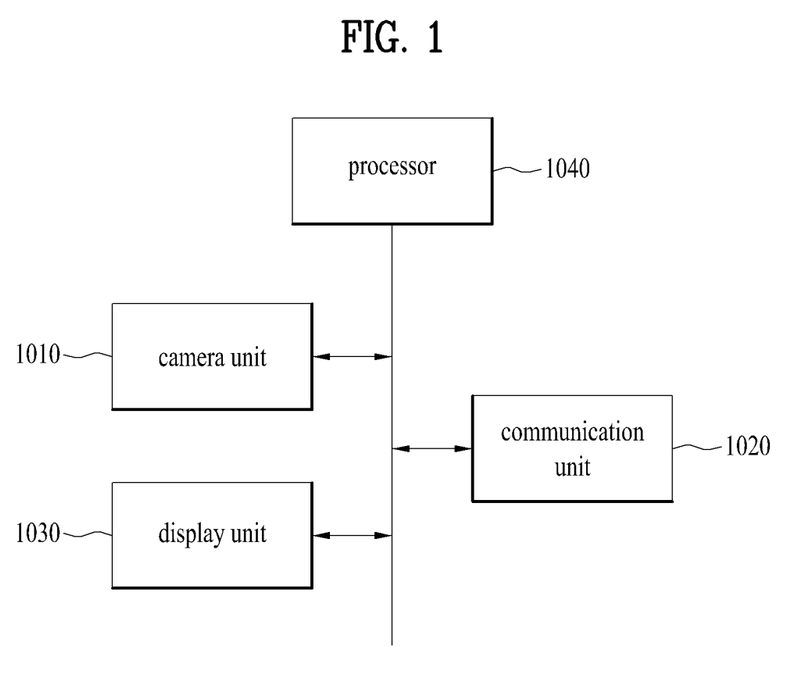
FIG. 1 is a block diagram illustrating a device according to one embodiment.

FIG. 1 is a block diagram illustrating a device according to one embodiment. In this specification, the device may include a camera unit 1010, a communication unit 1020, a display unit 1030, and a processor 1040.

The camera unit 1010 may capture an image in a forward direction of the device. In more detail, the camera unit 1010 may capture the image in a forward direction of the device by using at least one camera sensor provided in the device. The camera unit 1010 may capture an image within an angle of view area and transfer the captured result to the processor 1040. In particular, in this specification, the camera unit 1010 may capture a contents image which is being displayed in an external device located within an angle of view area and transfer the captured result to the processor 1040. At this time, the camera unit 1010 may partially capture a contents image area which is being displayed by the external device, among the image in a forward direction of the device. This will be described in more detail with reference to FIG. 3.

The communication unit 1020 may transmit and/or receive data to and from the external device and/or a web server by performing communication using various protocols. In more detail, the communication unit 1020 may transmit and/or receive various digital data such as augmented reality data and virtual image data by accessing a network through a wire or wireless. In this case, the external device may represent at least one digital device paired with the device or located at an angle of view area of the camera unit.

In this specification, the communication unit 1020 may transmit and/or receive digital data, which includes information on an object image, in accordance with the embodiment. Alternatively, the communication unit 1020 may transmit and/or digital data, which includes information on a position of the external device, in accordance with the embodiment.

The display unit 1030 may display visual information. In particular, the display unit 1030 may display a virtual image. In this case, the virtual image may represent a graphic user interface provided to a user through the display unit 1030. In the meantime, the display unit 1030 may include an optical see-through display panel. At this time, the display unit 1030 may provide the user with augmented reality by displaying a virtual image based on the reality word. In this specification, the display unit 1030 may provide the user with augmented reality by displaying the information on the object image as the virtual image.

The processor 1040 may implement various applications by processing data inside the device. Also, the processor 1040 may control contents implemented by the device, on the basis of an input. In this case, the contents represent various products, such as TV, movie, drama, art, photo, and game, which are product, information or contents manufactured by a digital mode.

Also, the processor 1040 controls each of the aforementioned units of the device, and may control data transmission and/or reception between the units.

In particular, in this specification, the processor 1040 may detect a contents image, which is being displayed in the external device, through the camera unit 1010. In this case, the contents image may mean still image, moving picture and partial image of the contents which is being displayed in the external device, or other various images that may visually be expressed. In particular, the contents image of this specification may be divided into a first image, which includes an object image, and a second image, which does not include an object image. This will be described in more detail with reference to FIG. 3.

Moreover, the processor 1040 may detect the object image included in the contents image which is being displayed in the external device. If the processor 1040 detects the object image, the processor 1040 may display the information on the object image detected in accordance with a predetermined user input. In this case, the object image represents an image which is a target of information search. Also, the information on the object image may include various kinds of information related to the corresponding image, such as search information through Internet, character information, trademark information, product information, purchasing place information, and purchasing place location information.

The processor 1040 may acquire the information on the object image through the communication unit 1020. In more detail, the processor 1040 may receive data on the object image through the communication unit 1020 if a search command for the object image is received. At this time, the processor 1040 may receive the data on the object image from the web server and/or the external device. Alternatively, the processor 1040 may acquire the data on the object image stored in the storage unit. The processor 1040 may acquire the information on the object image from the acquired data and display the acquired information on the display unit 1030. This will be described in more detail with reference to FIG. 2.

In the meantime, the processor 1040 may display the information corresponding to the object image. For example, the processor 1040 may display the corresponding information near the object image. Alternatively, the processor 1040 may display the corresponding information to overlap with the object image. This will be described in more detail with reference to FIG. 2.

Also, as the contents image displayed by the external device is switched to another contents image, if the object image is not detected any more, the processor 1040 may separately display the contents image, which includes the object image, in addition to the information on the object image. This is to assure, for the user, correlation between the information and the object image and continuity in providing the information. This will be described in more detail with reference to FIG. 3.

In addition, although not shown in FIG. 1, the device may additionally include a storage unit, an audio input and output unit, and/or a power unit.

The storage unit (not shown) may store various digital data such as audios, photos, moving pictures, applications, and virtual images. The storage unit may mean various digital data storage spaces such as a flash memory, a random access memory (RAM), and a solid state device (SSD).

Also, the storage unit may store the data on the object image. Also, the storage unit may temporarily store the data received from the external device through the communication unit 1020. At this time, the storage unit may be used for buffering for outputting the data received from the external device. In the meantime, the storage unit may selectively be provided in the device.

The audio output unit (not shown) includes an audio output means such as a speaker and earphone. Also, the audio output unit may output voice on the basis of contents implemented in the processor 1040 or the control command of the processor 1040. At this time, the audio output unit may selectively be provided on the device.

The power unit (not shown) is a power source connected with a battery inside the device or an external power, and may supply the power to the device.

Hereinafter, if each step or operation performed by the device starts or is performed by a user input, it is to be understood that a procedure of generating and receiving a signal in accordance with the user input includes the aforementioned procedure even without repeated description. Also, the processor 1040 may control the device or at least one unit included in the device in accordance with the user input, and may be described to refer to the device.

In the meantime, the device is shown in FIG. 1 as a block diagram according to one embodiment. In FIG. 1, respective blocks are shown to logically identify the elements of the device. Accordingly, the aforementioned elements of the device may be provided as one chip or a plurality of chips in accordance with design of the device.

Figure 2:
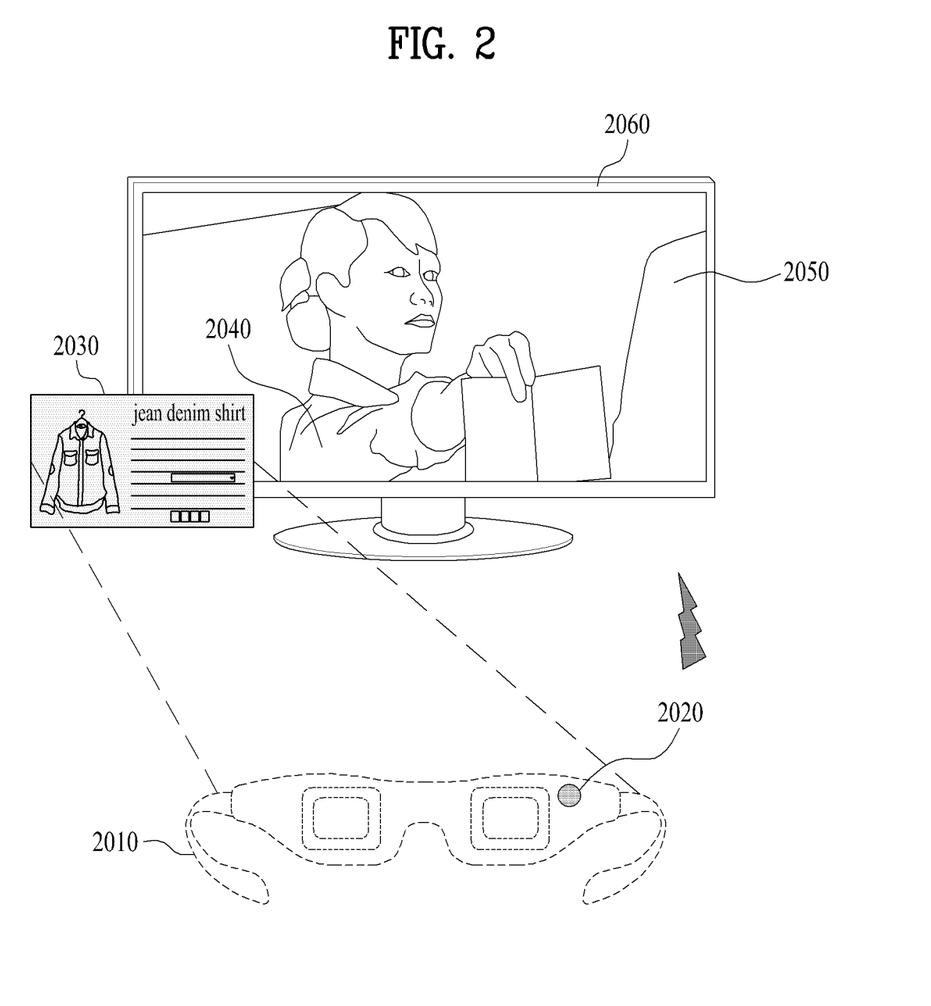
FIG. 2 is a diagram illustrating a device that displays information on an image which is being displayed in an external device in accordance with one embodiment.

FIG. 2 is a diagram illustrating a device that displays information on an image which is being displayed in an external device in accordance with one embodiment.

The device 2010 may display information 2030 on an object image, which is being displayed in an external device 2060. In more detail, the device 2010 may display the information 2030 on the object image 2040 included in a contents image 2050, which is being displayed in the external device 2060.

For example, while the user is watching a movie which is being displayed in the external device 2060 in a state that the user wears the device 2010, if the user inputs a search command for clothes 2040 worn by a main character of the movie, the device 2010 may receive data on the corresponding clothes 2040. In other words, if the device 2010 receives the search command for the object image 2040 which is being displayed in the external device 2060 located within an angle of view area of a camera unit 2020, the device 2010 may receive the data on the object image 2040.

At this time, the device 2010 may receive the data on the object image 2040 by using the communication unit. In more detail, as described with reference to FIG. 1, the device 2010 may acquire the data on the object image 2040 from the web server, the external device 2060 and/or the storage unit by using the communication unit. In this case, the data on the object image may be digital data previously stored in association with the contents, the contents image 2050 or the object image 2040, which is being displayed in the external device 2060. Alternatively, the data on the object image 2040 may be digital data acquired by performing a search in real time through the network in accordance with the search command input of the user.

If the information 2030 on the object image 2040 is acquired, the device 2010 may display the corresponding information 2030 on the display unit. For example, the device 2010 may display product information, trademark information, price information, purchasing place information and launching date information on the clothes 2040 worn by the main character of the movie, and various kinds of information related to the other clothes.

At this time, the device 2010 may display the information 2030 on the object image 2040 to correspond to the object image 2040. This is to emphasize correlation between the object image 2030 and the information 2030 on the object image 2040. Accordingly, the device 2010 may display the information 2030 on the object image 2040 near the object image 2040, display the information 2030 on the object image 2040 to overlap with the object image 2040, or display the information 2030 on the object image 2040 together with a directional image indicating the object image 2040.

Figure 3:
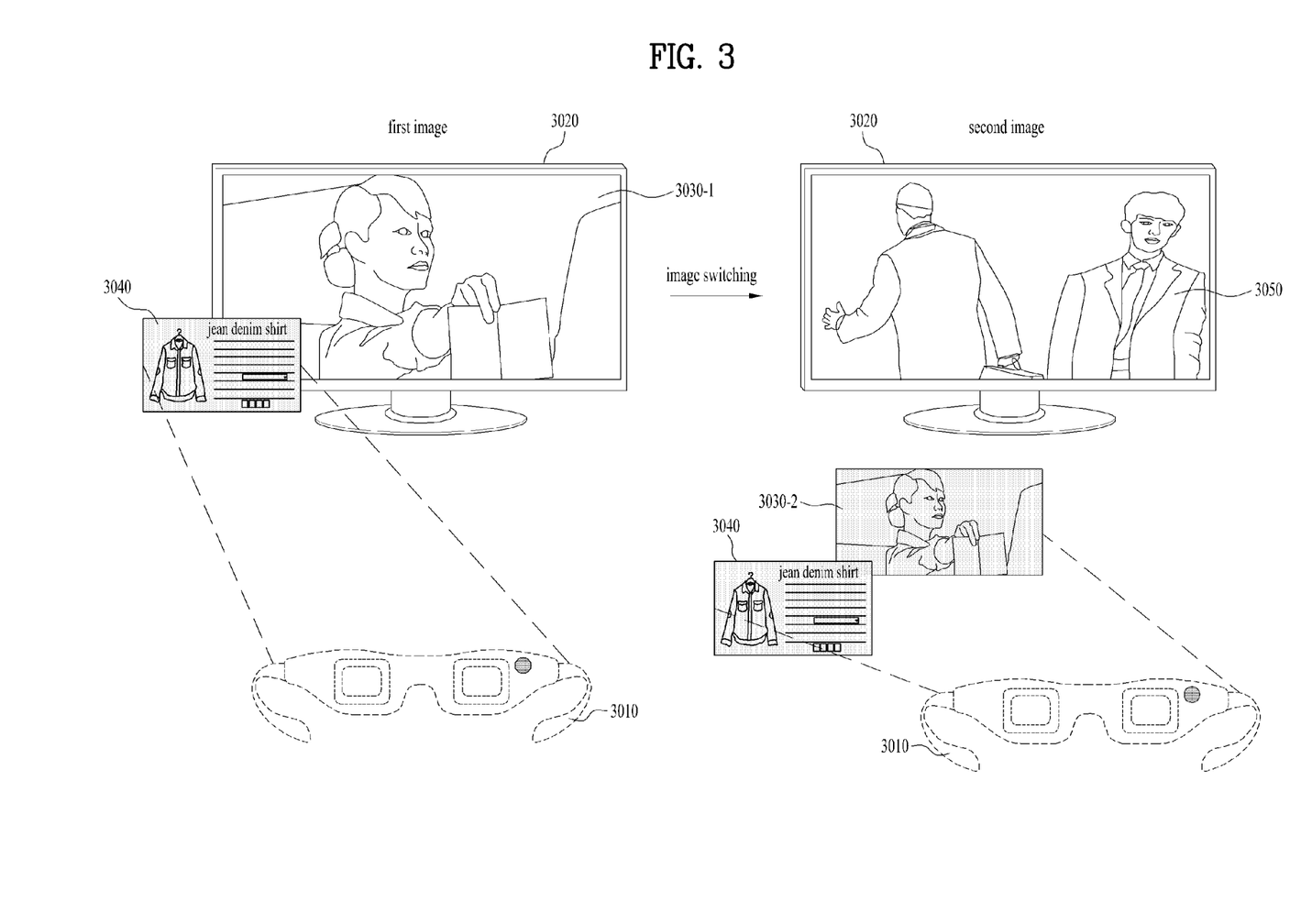
FIG. 3 is a diagram illustrating a device that separately displays a contents image, which includes an object image and information on the object image if the object image is not detected as the contents image is switched in accordance with one embodiment.

FIG. 3 is a diagram illustrating a device that separately displays a contents image, which includes an object image and information on the object image if the object image is not detected as the contents image is switched in accordance with one embodiment.

If the contents which is being displayed by the external device. 3020 is moving picture contents, a contents image 3030-1 may be switched to another contents image 3050. In particular, the contents image may be divided into a first image 3030-1, which includes the object image, and a second image 3050, which does not include the object image. As the moving picture contents is played, the first image 3030-1 may be switched to the second image 3050. Moreover, as the moving picture contents is played, the second image 3050 may again be switched to the first image 3030-1.

If the device 3010 detects that the first image 3030-1 is switched to the second image 3050 while the device 3010 is displaying the information 3040 on the object image of the first image 3030-1, the device 3010 may display the first image 3030-1 in addition to the information 3040 on the object image as virtual images. For example, if the device 3010 cannot detect clothes worn by a main character of a movie due to switching of a movie scene while the device 3010 is displaying the information 3040 on the clothes, the device 3010 may separately display a contents image 3030-2, which includes the corresponding clothes, and the information 3040 on the corresponding clothes to provide the user with them.

This is because that the user may misunderstand the corresponding information 3040 as information on the switched contents image 3050 if the corresponding information 3040 is displayed even after the contents image continuously switched. Alternatively, this is because that the corresponding information 3040 is not transferred to the user sufficiently if the corresponding information 3040 is not displayed as the object image is not detected due to switching of the contents image. In particular, if the display time of the corresponding information is not sufficient, it is likely that the corresponding information 3040 may not be transferred to the user sufficiently.

Accordingly, if the object image is not detected due to switching of the contents image, the device 3010 may separately display the first image 3030-2, which includes the object image, in addition to the information 3040 on the object image. Accordingly, the device 3010 may provide the user with the corresponding information in association with the object image for a sufficient time.

The device 3010 may detect switching from the first image 3030-1 to the second image 3050 by detecting the object image through the camera unit. Also, the device 3010 may detect switching from the first image 3030-1 to the second image 3050 by acquiring the data on the time when the object image is displayed, through the communication unit. Also, the device 3010 may detect switching from the first image 3030-1 to the second image 3050 by receiving a specific signal through the communication unit at the time when the first image 3030-1 is switched to the second image 3050. Also, the device 3010 may detect switching of the contents image through combination of the aforementioned methods. In addition, the device 3010 may detect switching from the first image 3030-1 to the second image 3050 through various methods without limitation to the aforementioned methods.

However, as the display of the first image 3030-1 is maintained, if the display of the information 3040 on the object image is maintained for a previously set time, the device 3010 may not display the first image 3030-2 and the information 3040 on the object image even though the first image is switched. In more detail, if the information 3040 on the object image is displayed for the previously set time, the device 3010 may not display the first image 3030-2 and the information 3040 on the object image even though the first image 3030-1 is switched to the second image 3050. This is because that the user may be regarded to sufficiently recognize the displayed information 3040 if the information 3040 on the object image is displayed for the previously set time. This will be described in more detail with reference to FIG. 6.

In the meantime, the device 3010 may display the first image 3030-2 and the information 3040 on the object image by acquiring the first image 3030-2 in various methods.

As one embodiment, the device 3010 may acquire the first image 3030-2 from the external device 3020. In more detail, the device 3010 may acquire the first image 3030-2 by performing communication with the external device 3020 by using the communication unit. For example, the external device 3020 may capture the first image 3030-2 at the time when the search command of the user is input and transmit the data on the captured first image 3030-2 to the device 3010. Alternatively, the external device 3020 may transmit the data on the first image 3030-2, which includes the object image, to the device 3010. If the device 3010 acquires the information 3040 related to the object image from the external device 3020, the external device 3020 may transmit the data on the corresponding information 3040 together with the data on the first image 3030-2. The device 3010 may acquire and display the first image 3030-2 by using the data on the first image 3030-2 received from the external device 3020.

As another embodiment, the device 3010 may acquire the first image 3030-2 through the camera unit. In more detail, the device 3010 may acquire the first image 3030-2 by capturing the first image 3030-2 through the camera unit at the time when the search command of the user is input. At this time, the device 3010 may partially capture the first image 3030-2 only by detecting the first image 3030-2 located within the angle of view area of the camera unit. At this time, the device 3010 may perform communication with the external device 3020 to exactly capture the first image 3030-2. In more detail, the device 3010 may partially capture the first image 3030-2 which is being displayed in the external device 3020, by acquiring the position of the external device 3020. At this time, the device 3010 may capture the first image 3030-2 by acquiring an absolute position and/or relative position of the external device 3020 by using various protocols such as GPS, Bluetooth, and NFC.

Figure 4:
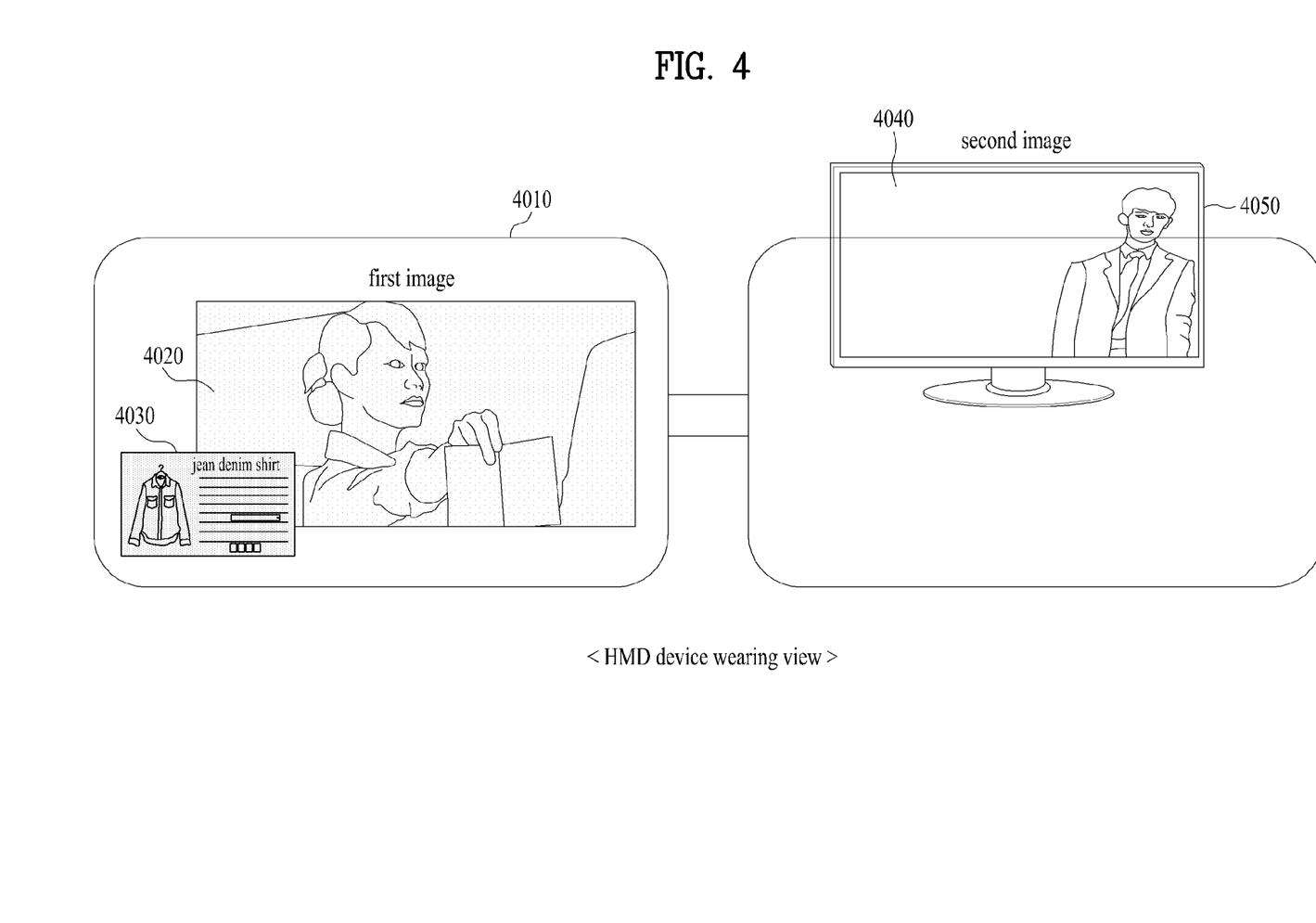
FIG. 4 is a diagram illustrating a device that displays a first image and information on an object image so as not to overlap with a second image in accordance with one embodiment.

FIG. 4 is a diagram illustrating a device that displays a first image and information on an object image so as not to overlap with a second image in accordance with one embodiment. In particular, FIG. 4 illustrates a view that the user views the external device 4050 through the display unit in a state that the user wears the device 4010.

As one embodiment, an optical see-through display panel may be used as the display unit. In this case, the user may view the external device 4050 through the display unit. At this time, the device 4010 may display the first image 4020 and the information 4030 on the object image so as not to overlap with the external device 4050, whereby the user may view the external device 4050 through the display unit without any interruption. In particular, the device 4010 may display the first image 4020 and the information 4030 on the object image so as not to overlap with the second image 4040 which is being displayed in the external device 4050.

The device 4010 may display the first image 4020 and the information 4030 so as not to overlap with the second image 4040 by controlling their size, transparency and/or position. For example, as shown in FIG. 4, the device 4010 may display the first image 4020 and the information 4030 on the object image on the display unit by controlling their positions so as not to overlap with the second image 4040. In more detail, if the second image 4040 is located at the right glass, the device 4010 may display the first image 4020 and the information 4030 on the object at the left glass.

At this time, the device 4010 may detect the position of the second image 4040 within the angle of view area by using the camera unit. Moreover, the device 4010 may perform communication with the external device 4050 by using the communication unit to exactly detect the position of the second image, as described with reference to FIG. 3. In addition, the device 4010 may detect the position of the second image 4040 or the external device 4050 in various manners without limitation to the aforementioned embodiment.

Figure 5:
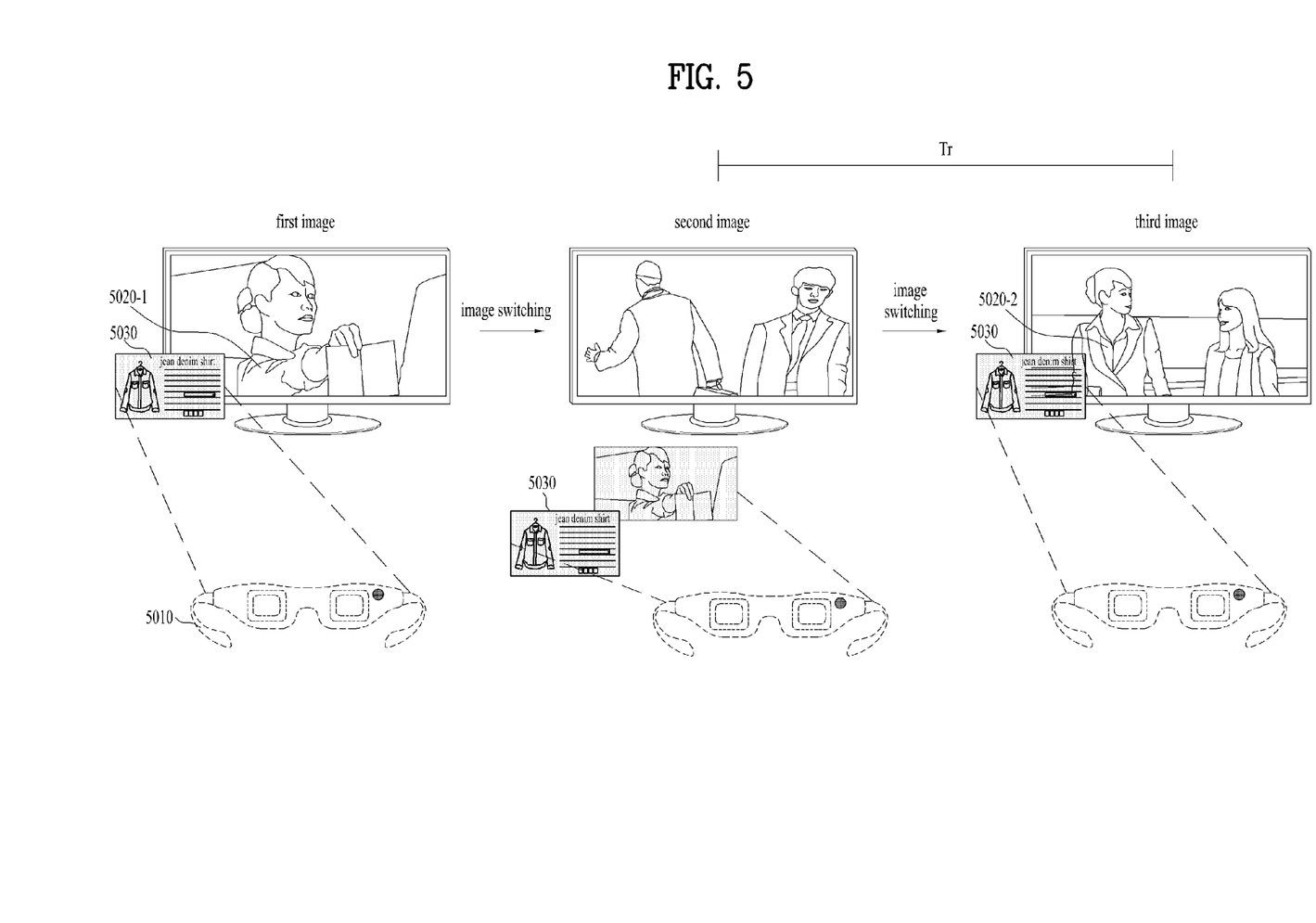
FIG. 5 is a diagram illustrating a device that does not display a first image if a second image is switched to a third image within a predetermined time in accordance with one embodiment.

FIG. 5 is a diagram illustrating a device that does not display a first image if a second image is switched to a third image within a predetermined time in accordance with one embodiment.

If the device 5010 detects switching from the first image to the second image, the device 5010 may display the first image in addition to information 5030 on an object image 5020-1. This is to maintain correlation between the object image 5020-1 and the information 5030 so as to avoid confusion of the user.

However, if the second image is switched to the third image, which includes an object image 5020-2, within a predetermined time Tr after being switched to the second image, the device 5010 may not display the first image. Alternatively, if the device 5010 detects switching from the second image to the third image within the predetermined time Tr after switching to the second image, the device 5010 may display only the information 5030 on the object image.

The display of the first image together with the information 5030 is to maintain the correlation between the information 5030 and the object image 5020-1. In case of switching to the third image, which includes the object image 5020-2, even though the information 5030 on the object image 5020-2 is only displayed, the correlation between the information 5030 and the object image 5020-2 may be maintained. This is because that the third image is the contents image, which includes the object image 5020-2, although the third image is different from the first image. Accordingly, in this case, if the device 5010 detects switching to the third image, the device 5010 may display only the information 5030 on the object image 5020-2 without displaying the first image. In this context, even though the second image is again switched to the first image within the predetermined time Tr, the device 5010 may display only the information 5030 on the object image 5020-2.

The device 5010 may detect the object image 5020-2 included in the third image and display the information 5030 on the corresponding object image 5020-2. At this time, the device 5010 may display the information 5030 corresponding to the object image 5020-2 included in the third image.

The device 5010 may detect switching to the third image in the same manner as that switching to the second image is detected. Accordingly, the device may detect switching from the second image to the third image by using the camera unit and/or the communication unit as described with reference to FIG. 3.

Figure 6:
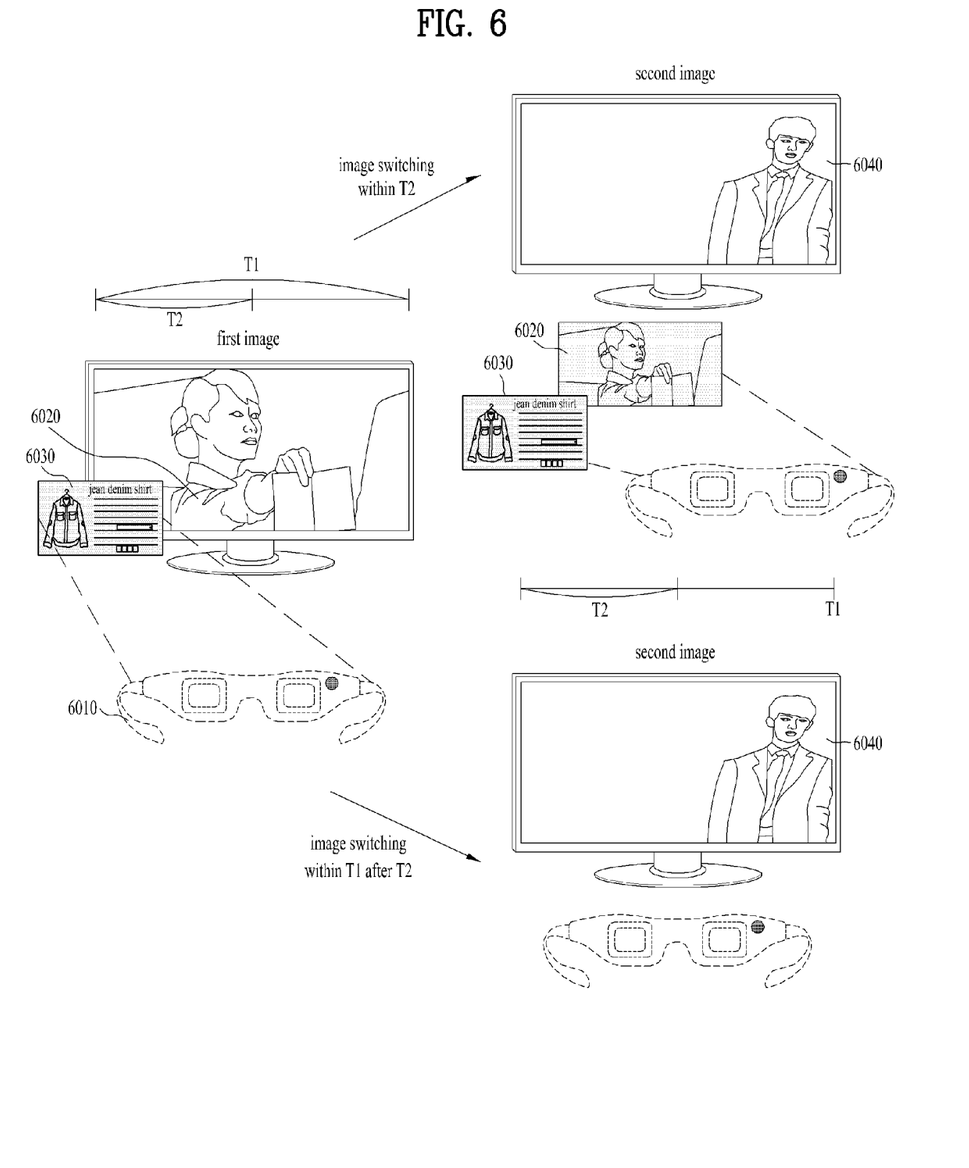
FIG. 6 is a diagram illustrating a device that controls display of a first image and/or an object image on the basis of a threshold time in accordance with one embodiment.

FIG. 6 is a diagram illustrating a device that controls display of a first image and/or an object image on the basis of a threshold time in accordance with one embodiment.

As one embodiment, if the device 6010 displays information 6030 on the object image, the device 6010 may display the corresponding information 6030 for a first threshold time T1. If the display of the information 6030 is maintained for a certain time, the user may be likely to sufficiently recognize the displayed information 6030, and continuous display may interrupt the user's vision. Accordingly, the device 6010 may designate a sufficient time, which may allow the user to recognize the information 6030, as a first threshold time T1, and may display the corresponding information 6030 for the first threshold time T1.

At this time, the device 6010 may additionally designate a second threshold time T2 and control the display of the first image 6020 and the information 6030 on the object image. In more detail, the device 6010 may display the information 6030 on the object image for the first threshold time T1 as described above. In this way, if the device 6010 detects switching from the first image 6020 to the second image 6040 while displaying the information 6030 on the object image, the device 6010 may determine whether to display the first image 6020 and the information 6030 on the object image on the basis of the second threshold time T2 shorter than the first threshold time T1.

For example, if the device 6010 detects switching from the first image 6020 to the second image 6040 within the second threshold time T2 after the information 6030 on the object image is displayed, the device 6010 may display the first image 6020 in addition to the corresponding information 6030. However, if the device 6010 detects switching from the first image 6020 to the second image 6040 within the first threshold time T1 after the information 6030 on the object image is displayed, the device 6010 may not display the first image 6020 and the corresponding information 6030. In other words, the first threshold time T1 for displaying the information 6030 on the object image may exist separately from the second threshold time T2 based on screen switching, for displaying the first image 6020 and the information 6030. Also, the second threshold time T2 may be shorter than the first threshold time T1.

If the first image 6020 and the information 6030 are displayed for the second threshold time T2, the user may be likely to sufficiently recognize the first image 6020 and the information 6030. For this reason, the second threshold time T2 is designated. Also, if a separate screen is displayed whenever the screen is switched, it may interrupt the user's viewing.

The first threshold time T1 and the second threshold time T2 may be designated in various manners in accordance with usage of the device 6010, a type of an application which is being implemented, a mode which is being implemented, design, embodiment, and setting of the user without limitation to the aforementioned embodiment.

Figure 7:
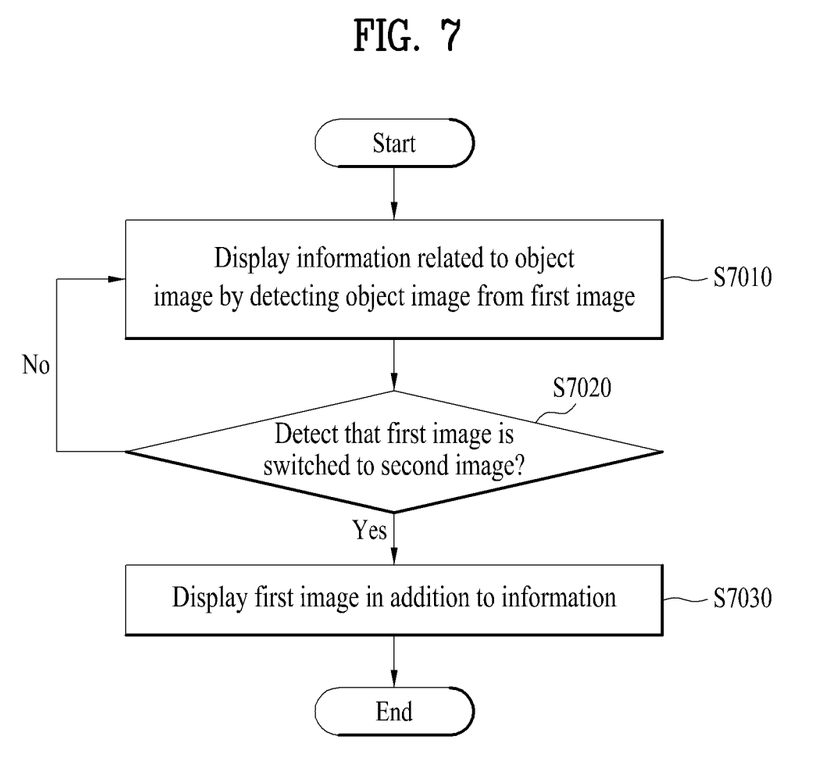
FIG. 7 is a flow chart illustrating a method for controlling a device according to the embodiment.

FIG. 7 is a flow chart illustrating a method for controlling a device according to the embodiment. The detailed description of parts similar to or repeated with the description described with reference to FIG. 1 to FIG. 6 will be omitted.

First of all, the device may detect the object image from the first image and display the information related to the object image on the display unit (S7010). In this case, the first image may represent the contents image, which includes the object image. Also, the first image may be the contents image which is being displayed in the external device located in the angle of view area of the camera unit. The device may acquire the first image and the information on the object image included in the first image through the communication unit as described in more detail with reference to FIG. 1 to FIG. 3. If the device displays the information on the object image, the device may display the information on the object image to correspond to the object image as described with reference to FIG. 2.

Next, the device may determine whether the first image is switched to the second image (S7020). In this case, the second image may represent the contents image, which does not include the object image. Also, the second image may be the contents image which is being displayed in the external device located in the angle of view area of the camera unit. The device may determine whether the first image is switched to the second image, through the camera unit and/or the communication unit, as described with reference to FIG. 3.

If the device detects switching from the first image to the second image, the device may display the first image in addition to the information on the object image on the display unit (S7030). At this time, the device may display the first image and the corresponding information so as not to overlap with the second image. This is not to interrupt the user's vision for the second image as described with reference to FIG. 4.

On the other hand, if the display of the first image is maintained as it is without switching, the device may maintain the display of the information on the object image as it is (S7010). In other words, the device may maintain the display of the information on the object image as far as the first image is not switched to the second image.

Moreover, although not shown in this flow chart, if the device detects switching to the third image within the predetermined time after switching to the second image, the device may display only the information on the object image. In other words, if the device detects switching to the third image within the predetermined time after displaying the first image and the information on the object image, the device may not display the first image. In this case, the third image may represent the image, which includes the object image and is not the first image. Switching to the third image has been described in more detail with reference to FIG. 5.

Also, although not shown in this flow chart, the device may control the display of the first image and/or the information on the object image by designating the threshold time as described with reference to FIG. 6.

Although the description may be made for each of the drawings for convenience of description, the embodiments of the respective drawings may be incorporated to achieve a new embodiment. Also, a computer readable recording medium where a program for implementing the embodiments is recorded may be designed in accordance with the need of the person skilled in the art within the scope of the present specification.

Also, the device and the method for controlling the same are not limited to the aforementioned embodiments, and all or some of the aforementioned embodiments may selectively be configured in combination so that various modifications may be made in the aforementioned embodiments.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Also, the device and the method for controlling the same of this specification may be implemented in a recording medium, which can be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

Also, in this specification, it is to be understood that the time means the exact value and includes the substantial time of a certain range. In other words, the time in this specification may represent the substantial time, and an error of a certain range may exist in the time.

Also, in this specification, both the product invention and the method invention have been described, and description of both inventions may be made complementally if necessary.

What is claimed is:

1. A head mounted display (HMD) device comprising:
   a communication controller configured to receive and transmit data;
   a display configured to display visual information;
   a camera configured to capture an image; and
   a processor configured to control the communication controller, the display and the camera,
   wherein the processor is further configured to:
   detect an object image from a first image including the object image, the first image being displayed in an external device located in an angle of view area of the camera,
   display information related to the object image when detecting that the first image including the object image is displayed in an external device, and
   display the first image including the object image in addition to the information when detecting that the first image is switched to a second image, which does not include the object image and is displayed in the external device.

2. The HMD device according to claim 1, wherein the external device is paired with the HMD device.

3. The HMD device according to claim 1, wherein the processor is further configured to:
   receive first image data related to the first image from the external device,
   acquire the first image from the received first image data, and
   display the acquired first image in addition to the information when detecting that the first image is switched to the second image.

4. The HMD device according to claim 1, wherein the processor, when the information related to the object image is being displayed, is further configured to:
   capture the first image when the object image is detected, and
   display the captured first image in addition to the information when detecting that the first image is switched to the second image.

5. The HMD device according to claim 1, wherein the processor is further configured to display the first image in addition to the information so as not to overlap with the second image.

6. The HMD device according to claim 1, wherein the processor is further configured to display the information related to the object image for a first threshold time.

7. The HMD device according to claim 6, wherein the processor is further configured to:
   display the first image in addition to the information when detecting that the first image is switched to the second image within a second threshold time, and
   not display the first image and the information when detecting that the first image is switched to the second image for more than the second threshold time and within the first threshold time.

8. The HMD device according to claim 1, wherein the processor is further configured not to display the first image when detecting that the second image is switched to a third image, which includes the object image, within a third threshold time, after the first image is switched to the second image.

9. The HMD device according to claim 1, wherein the display includes an optical see-through display panel.

10. The HMD device according to claim 1, wherein the processor is further configured to display the information related to the object image to correspond to the object image.

11. A method for controlling a head mounted display (HMD) device, the method comprising:
- detecting an object image from a first image including the object image, the first image being displayed in an external device located in an angle of view area of a camera;
- displaying information related to the object image when detecting that the first image including the object image is displayed in an external device;
- detecting that the first image is switched to a second image, which does not include the object image and is displayed in the external device; and
- displaying the first image including the object image in addition to the information when detecting that the first image is switched to the second image.

12. The method according to claim 11, wherein the external device is paired with the HMD device.

13. The method according to claim 11, wherein the step of displaying the first image in addition to the information includes:
- receiving first image data related to the first image from the external device,
- acquiring the first image from the received first image data, and
- displaying the acquired first image in addition to the information.

14. The method according to claim 11, further comprising the steps of:
- when the information related to the object image is being displayed,
- capturing the first image when the object image is detected; and
- displaying the captured first image in addition to the information when detecting that the first image is switched to the second image.

15. The method according to claim 11, further comprising the step of displaying the first image in addition to the information so as not to overlap with the second image.

16. The method according to claim 11, further comprising the step of displaying the information related to the object image for a first threshold time.

17. The method according to claim 16, further comprising the step of:
- displaying the first image in addition to the information when detecting that the first image is switched to the second image within a second threshold time, and
- not displaying the first image and the information when detecting that the first image is switched to the second image for more than the second threshold time and within the first threshold time.

18. The method according to claim 11, further comprising the step of not displaying the first image when detecting that the second image is switched to a third image, which includes the object image, within a third threshold time, after the first image is switched to the second image.

19. The method according to claim 11, further comprising the step of displaying the information related to the object image to correspond to the object image.

* * * * *